United States Patent
Carey et al.

(10) Patent No.: US 8,439,790 B2
(45) Date of Patent: May 14, 2013

(54) MULTI-SPEED TRANSMISSION HAVING THREE PLANETARY GEAR SETS

(75) Inventors: Clinton E. Carey, Highland, MI (US); Scott H. Wittkopp, Ypsilanti, MI (US); James M. Hart, Belleville, MI (US); Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 302 days.

(21) Appl. No.: 12/844,176

(22) Filed: Jul. 27, 2010

(65) Prior Publication Data

US 2011/0034292 A1 Feb. 10, 2011

Related U.S. Application Data

(60) Provisional application No. 61/231,525, filed on Aug. 5, 2009.

(51) Int. Cl.
*F16H 3/62* (2006.01)

(52) U.S. Cl.
USPC .......................................................... 475/275

(58) Field of Classification Search ........................ None
See application file for complete search history.

(56) References Cited

U.S. PATENT DOCUMENTS

| | | | | |
|---|---|---|---|---|
| 4,070,927 A * | 1/1978 | Polak | ............................ | 475/286 |
| 5,435,792 A * | 7/1995 | Justice et al. | .................. | 475/276 |
| 5,536,220 A * | 7/1996 | Martin | ........................... | 475/275 |
| 5,599,251 A * | 2/1997 | Beim et al. | ..................... | 475/275 |
| 5,755,636 A * | 5/1998 | Justice et al. | .................. | 475/275 |
| 5,823,909 A * | 10/1998 | Beim et al. | ..................... | 475/269 |
| 6,053,839 A * | 4/2000 | Baldwin et al. | ............... | 475/281 |
| 6,652,409 B2 * | 11/2003 | Kao et al. | ....................... | 475/275 |
| 6,705,969 B2 * | 3/2004 | Bucknor et al. | ............... | 475/290 |
| 6,743,139 B1 * | 6/2004 | Usoro et al. | .................... | 475/275 |
| 6,793,605 B2 * | 9/2004 | Raghavan et al. | ............. | 475/275 |
| 7,033,299 B2 * | 4/2006 | Bucknor et al. | ............... | 475/275 |
| 7,175,561 B2 * | 2/2007 | Usoro et al. | .................... | 475/275 |
| 7,192,378 B2 * | 3/2007 | Raghavan et al. | ............. | 475/276 |
| 7,226,382 B2 * | 6/2007 | Bucknor et al. | ............... | 475/275 |
| 7,247,120 B2 * | 7/2007 | Raghavan et al. | ............. | 475/276 |
| 7,695,394 B2 * | 4/2010 | Phillips et al. | ................ | 475/275 |
| 7,736,263 B2 * | 6/2010 | Phillips et al. | ................ | 475/277 |
| 7,887,453 B2 * | 2/2011 | Phillips et al. | ................ | 475/275 |
| 7,909,726 B2 * | 3/2011 | Phillips et al. | ................ | 475/282 |
| 7,914,414 B2 * | 3/2011 | Phillips et al. | ................ | 475/276 |
| 7,993,238 B2 * | 8/2011 | Phillips et al. | ................ | 475/282 |
| 8,033,947 B2 * | 10/2011 | Phillips et al. | ................ | 475/275 |
| 8,047,948 B2 * | 11/2011 | Phillips et al. | ................ | 475/275 |
| 8,052,565 B2 * | 11/2011 | Phillips et al. | ................ | 475/275 |
| 8,088,031 B2 * | 1/2012 | Phillips et al. | ................ | 475/275 |
| 8,157,695 B2 * | 4/2012 | Phillips et al. | ................ | 475/275 |
| 8,257,219 B2 * | 9/2012 | Phillips | ......................... | 475/284 |
| 2010/0210396 A1 * | 8/2010 | Wittkopp et al. | ............. | 475/275 |
| 2010/0210400 A1 * | 8/2010 | Phillips et al. | ................ | 475/275 |
| 2010/0210402 A1 * | 8/2010 | Phillips et al. | ................ | 475/275 |
| 2010/0216589 A1 * | 8/2010 | Hart et al. | ....................... | 475/275 |
| 2010/0216590 A1 * | 8/2010 | Phillips et al. | ................ | 475/275 |
| 2010/0323842 A1 * | 12/2010 | Wittkopp et al. | ............. | 475/275 |

(Continued)

*Primary Examiner* — Dirk Wright (57) ABSTRACT

A transmission is provided having an input member, an output member, three planetary gear sets, a plurality of coupling members and a plurality of torque transmitting devices. Each of the planetary gear sets includes first, second and third members. The torque transmitting devices include clutches and brakes.

7 Claims, 5 Drawing Sheets

U.S. PATENT DOCUMENTS

2011/0160018 A1* 6/2011 Hart et al. ............. 475/275
2012/0058856 A1* 3/2012 Phillips et al. ........... 475/275
2012/0178578 A1* 7/2012 Mellet et al. ............ 475/254
2012/0202638 A1* 8/2012 Phillips et al. ........... 475/276
2012/0202639 A1* 8/2012 Wittkopp et al. ......... 475/276
2012/0214636 A1* 8/2012 Hart et al. ............. 475/276

* cited by examiner

| GEAR STATE | GEAR RATIO | RATIO STEP | TORQUE TRANSMITTING ELEMENTS ||||
|---|---|---|---|---|---|---|
| | | | 34 | 32 | 28 | 26 |
| REV | -2.841 | | | X | X | |
| N | | -0.82 | | | | |
| 1ST | 3.448 | | X | X | | |
| 2ND | 2.125 | 1.62 | | X | | X |
| 3RD | 1.273 | 1.67 | X | | | X |
| 4TH | 1.000 | 1.27 | | | X | X |
| 5TH | 0.757 | 1.32 | X | | X | |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | |
|---|---|---|---|---|---|---|
| | | | 132 | 134 | 126 | 128 |
| REV | -4.178 | | | | X | X |
| N | | -0.89 | | O | | |
| 1ST | 4.702 | | | X | | X |
| 2ND | 2.987 | 1.57 | X | X | | |
| 3RD | 1.804 | 1.66 | X | | | X |
| 4TH | 1.368 | 1.32 | X | | X | |
| 5TH | 1.000 | 1.37 | | | X | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | |
|---|---|---|---|---|---|---|
| | | | 232 | 234 | 226 | 228 |
| REV | -3.157 | | X | | X | |
| N | | -0.81 | | | | |
| 1ST | 3.911 | | X | | | X |
| 2ND | 2.408 | 1.62 | X | X | | |
| 3RD | 1.700 | 1.42 | | X | | X |
| 4TH | 1.389 | 1.22 | | X | X | |
| 5TH | 1.000 | 1.39 | | | X | X |

X = ON - ENGAGED CARRYING TORQUE
O = ON - ENGAGED NOT CARRYING TORQUE

FIG. 9

MULTI-SPEED TRANSMISSION HAVING THREE PLANETARY GEAR SETS

CROSS-REFERENCE TO RELATED APPLICATIONS

This application claims priority to U.S. Provisional Application No. 61/231,525, filed on Aug. 5, 2009, which is hereby incorporated in its entirety herein by reference.

FIELD

The invention relates generally to a multiple speed transmission having a plurality of planetary gear sets and a plurality of torque transmitting devices and more particularly to a transmission having five or more speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of coupling members and a plurality of torque transmitting devices. Each of the planetary gear sets includes first, second and third members. The torque transmitting devices are for example clutches and brakes.

In one embodiment, a transmission includes an input member, an output member, first, second and third planetary gear sets each having first, second and third members, a first interconnecting member continuously interconnecting the first member of the first planetary gear set with the first member of the second planetary gear set, a second interconnecting member continuously interconnecting the second member of the first planetary gear set with the second member of the second planetary gear set, and a third interconnecting member continuously interconnecting the third member of the second planetary gear set with the third member of the third planetary gear set. A first torque transmitting mechanism is selectively engageable to interconnect the first member of the first planetary gear set and the first member of the second planetary gear set with the first member of the third planetary gear set and the input member, a second torque transmitting mechanism is selectively engageable to interconnect the first member of the first planetary gear set and the first member of the second planetary gear set with the second member of the third planetary gear set and the output member, a third torque transmitting mechanism is selectively engageable to interconnect the third member of the first planetary gear set with a stationary member, and a fourth torque transmitting mechanism is selectively engageable to interconnect the second member of the first planetary gear set and the second member of the second planetary gear set with the stationary member. The torque transmitting mechanisms are selectively engageable in combinations of at least two to establish at least five forward speed ratios and at least one reverse speed ratio between the input member and the output member.

In another embodiment, a transmission includes an input member, an output member, first, second and third planetary gear sets each having first, second and third members, a first interconnecting member continuously interconnecting the second member of the first planetary gear set with the first member of the second planetary gear set, a second interconnecting member continuously interconnecting the third member of the first planetary gear set with the second member of the second planetary gear set, and a third interconnecting member continuously interconnecting the third member of the second planetary gear set with the second member of the third planetary gear set. A first torque transmitting mechanism is selectively engageable to interconnect the first member of the first planetary gear set with the third member of the third planetary gear set and the input member, a second torque transmitting mechanism is selectively engageable to interconnect the first member of the first planetary gear set with the first member of the third planetary gear set, a third torque transmitting mechanism is selectively engageable to interconnect the second member of the first planetary gear set and the first member of the second planetary gear set with a stationary member, and a fourth torque transmitting mechanism is selectively engageable to interconnect the first member of the third planetary gear set with the stationary member. The torque transmitting mechanisms are selectively engageable in combinations of at least two to establish at least five forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that the embodiments of the five speed automatic transmission of the present invention have an arrangement of permanent mechanical connections between the elements of the three planetary gear sets. A second component or element of a first planetary gear set is permanently coupled to a first component or element of a second planetary gear set. A third component or element of the first planetary gear set is permanently coupled to a third component or element of the second planetary gear set. A second component or element of the second planetary gear set is permanently coupled to a second component or element of a third planetary gear set.

Figure 1:
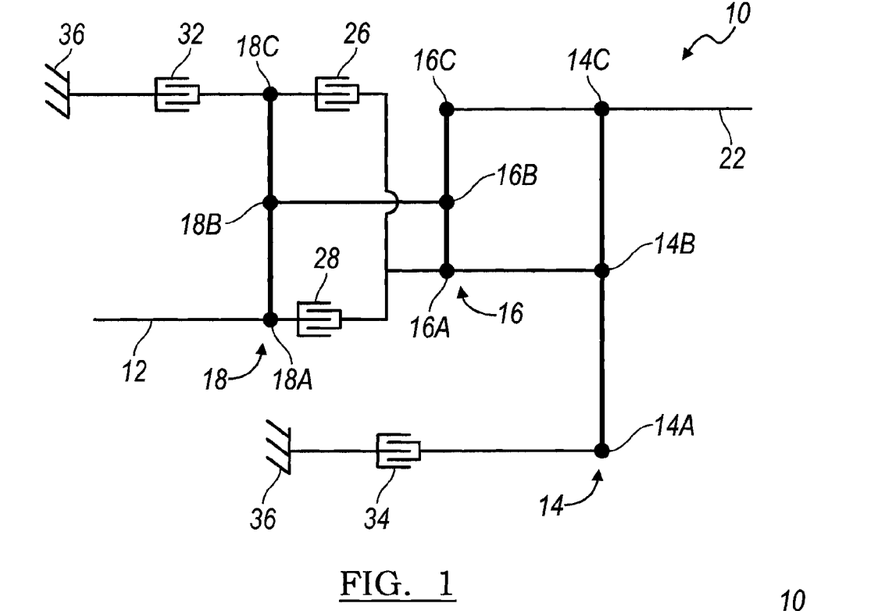
FIG. 1 is a lever diagram of an embodiment of a five speed transmission according to the present invention.

Referring now to FIG. 1, an embodiment of a five speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and an output shaft or member 22. The first planetary gear set 14 has three nodes: a first node 14A, a second node 14B, and a third node 14C. The second planetary gear set 16 has three nodes: a first node 16A, a second node 16B, and a third node 16C. The third planetary gear set 18 has three nodes: a first node 18A, a second node 18B and a third node 18C.

The input member 12 is continuously coupled to the first node 18A of the third planetary gear set 18. The output member 22 is coupled to the third node 14C of the first planetary gear set 14 and to the third node 16C of the second planetary gear set 16. The second node 14B of the first planetary gear set 14 is coupled to the first node 16A of the second planetary gear set 16. The third node 14C of the first planetary gear set 14 is coupled to the third node 16C of the second planetary gear set 16. The second node 16B of the second planetary gear set 16 is coupled to the second node 18B of the third planetary gear set.

A first clutch 26 selectively connects the third node 18C of the third planetary gear set 18 with the first node 16A of the second planetary gear set 16 and the second node 14B of the first planetary gear set 14. A second clutch 28 selectively connects the input member 12 and the first node 18A of the third planetary gear set 18 with the first node 16A of the second planetary gear set 16 and the second node 14B of the first planetary gear set 14. A first brake 32 selectively connects the third node 18C of the third planetary gear set 18 with a stationary member or transmission housing 36. A second brake 34 selectively connects the first node 14A of the first planetary gear set 14 with a stationary member or transmission housing 36.

Figure 2:
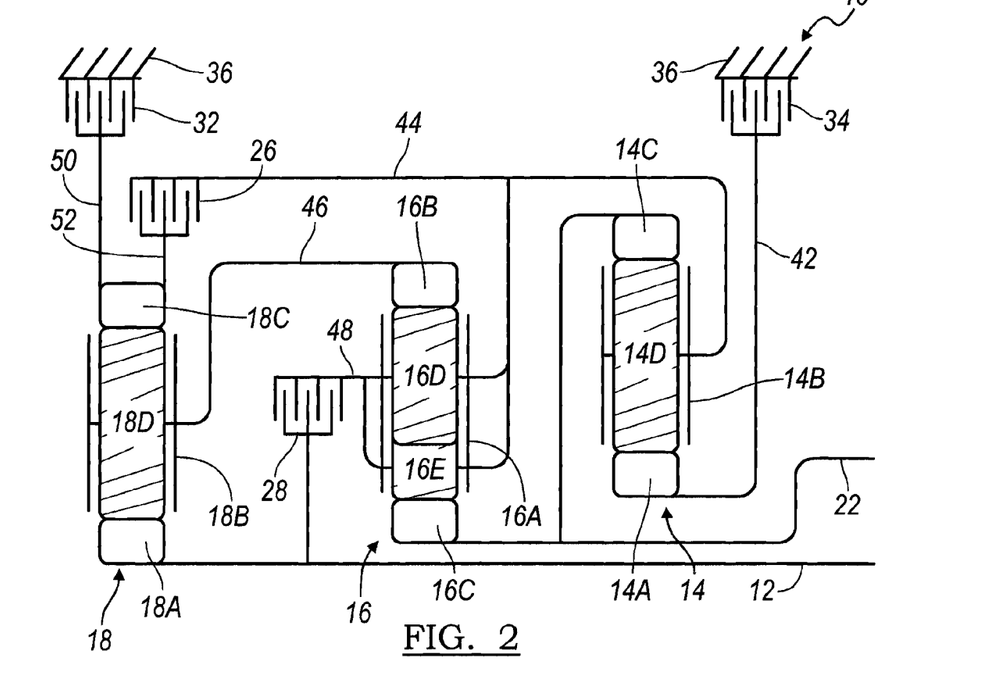
FIG. 2 is a diagrammatic illustration of an embodiment of a five speed transmission according to the present invention.

Referring now to FIG. 2, a stick diagram presents a schematic layout of the embodiment of the five speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42. The ring gear member 14C is connected for common rotation with the output shaft or member 22. The planet carrier member 14B is connected for common rotation with a second shaft or interconnecting member 44. The planet gears 14D are each configured to intermesh with both the sun gear member 14A and the ring gear member 14C.

The planetary gear set 16 includes a sun gear member 16C, a ring gear member 16B and a planet gear carrier member 16A that rotatably supports a set of planet gears 16D (only one of which is shown) and a set of planet gears 16E (only one of which is shown). The sun gear member 16C is connected for common rotation with the output member 22. The ring gear member 16B is connected for common rotation with a third shaft or interconnecting member 46. The planet carrier member 16A is connected for common rotation with the second shaft or interconnecting member 44 and with a fourth shaft or interconnecting member 48. The planet gears 16D are each configured to intermesh with both the ring gear member 16B and the planet gears 16E. The planet gears 16E are each configured to intermesh with both the sun gear member 16C and the planet gears 16D.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with the input shaft or member 12. The ring gear member 18C is connected for common rotation with a fifth shaft or interconnecting member 50 and with a sixth shaft or interconnecting member 52. The planet carrier member 18B is connected for common rotation with the third shaft or interconnecting member 46. The planet gears 18D are each configured to intermesh with both the sun gear member 18A and the ring gear member 18C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26 and 28 and brakes 32 and 34 allow for selective interconnection of the shafts or interconnecting members, members of the planetary gear sets and the housing. For example, the first clutch 26 is selectively engageable to connect the second shaft or interconnecting member 44 with the sixth shaft or interconnecting member 52. The second clutch 28 is selectively engageable to connect the fourth shaft or interconnecting member 48 and the second shaft or interconnecting member 44 with the input member 12. The first brake 32 is selectively engageable to connect the fifth shaft or interconnecting member 50 with the stationary element or the transmission housing 36 in order to restrict the member 50 from rotating relative to the transmission housing 36. The second brake 34 is selectively engageable to connect the first shaft or interconnecting member 42 with the stationary element or the transmission housing 36 in order to restrict the member 42 from rotating relative to the transmission housing 36.

Figure 3:
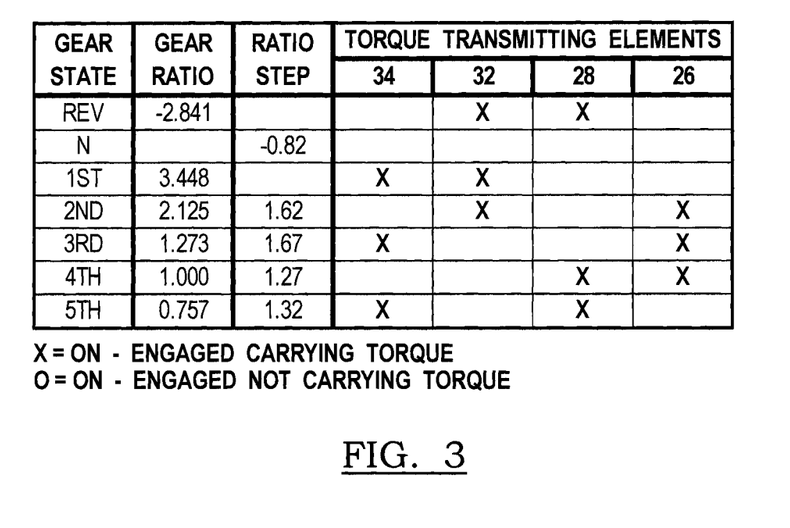
FIG. 3 is a truth table presenting the state of engagement of the various torque transmitting elements in each of the available forward and reverse speeds or gear ratios of the transmission illustrated in FIGS. 1 and 2.

Referring now to FIG. 2 and FIG. 3, the operation of the embodiment of the five speed transmission 10 will be described. It will be appreciated that transmission 10 is capable of transmitting torque from the input shaft or member 12 to the output shaft or member 22 in at least five forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 32 and second brake 34), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, the second clutch 28 and the first brake 32 are engaged or activated. The second clutch 28 connects the fourth shaft or interconnecting member 48 and the second shaft or interconnecting member 44 with the input member 12. The first brake 32 is selectively engageable to connect the fifth shaft or interconnecting member 50 with the stationary element or the transmission housing 36 in order to restrict the member 50 from rotating relative to the transmission housing 36. Likewise, the five forward ratios are achieved through different combinations of clutch and brake engagement, as shown in FIG. 3.

It will be appreciated that the foregoing explanation of operation and gear states of the five speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 4:
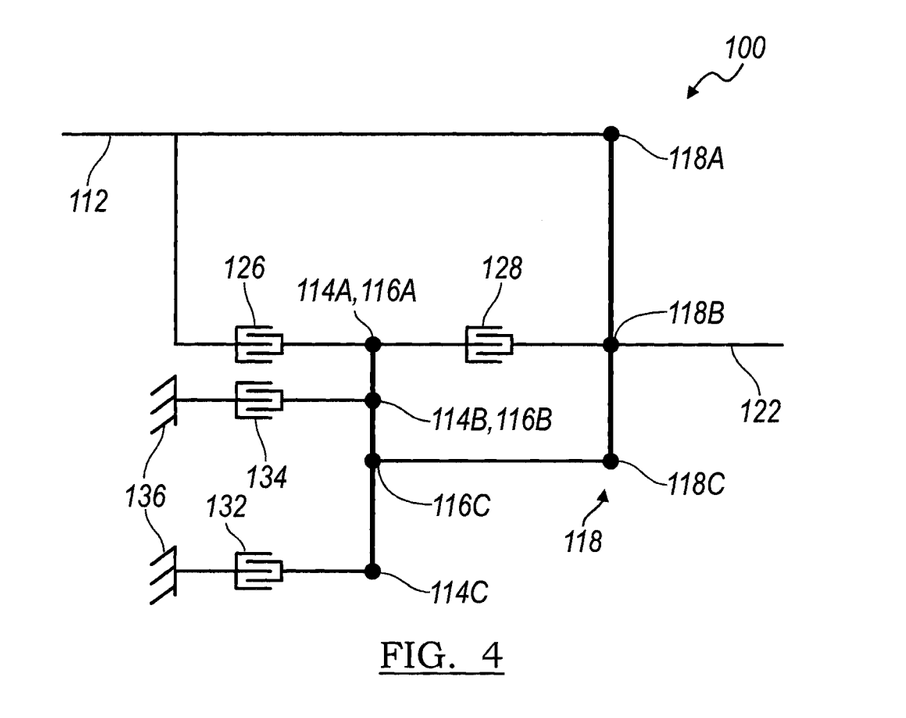
FIG. 4 is a lever diagram of an embodiment of a five speed transmission according to the present invention.

Referring now to FIG. 4, another embodiment of a five speed transmission 100 is illustrated in a lever diagram format. The transmission 100 includes an input shaft or member 112, a first planetary gear set 114, a second planetary gear set 116, a third planetary gear set 118 and an output shaft or member 122. In the lever diagram of FIG. 1, the levers for the first planetary gear set 114 and the second planetary gear set 116 have been combined into a single four node lever 114,116 having: a first node 114A, 116A, a second node 114B, 116B, a third node 116C and a fourth node 114C. The third planetary gear set 118 has three nodes: a first node 118A, a second node 118B and a third node 118C.

The input member 112 is continuously coupled to the first node 118A of the third planetary gear set 118. The output member 122 is coupled to the second node 118B of the third planetary gear set 118. The second node 114B of the first planetary gear set 114 is coupled to the second node 116B of the second planetary gear set 116. The first node 114A of the first planetary gear set 114 is coupled to the first node 116A of the second planetary gear set 116. The third node 116C of the second planetary gear set 116 is coupled to the third node 118C of the third planetary gear set 118.

A first clutch 126 selectively connects the first node 114A of the first planetary gear set 114 and the first node 116A of the second planetary gear set 116 with the first node 118A of the third planetary gear set 118 and the input member 112. A second clutch 128 selectively connects the second node 118B of the third planetary gear set 118 and output member 122 with the first node 114A of the first planetary gear set 114 and the first node 116A of the second planetary gear set 116. A first brake 132 selectively connects the third node 114C of the first planetary gear set 114 with a stationary member or transmission housing 136. A second brake 134 selectively connects the second node 114B of the first planetary gear set 114 and the second node 116B of the second planetary gear set 116 with a stationary member or transmission housing 136.

Figure 5:
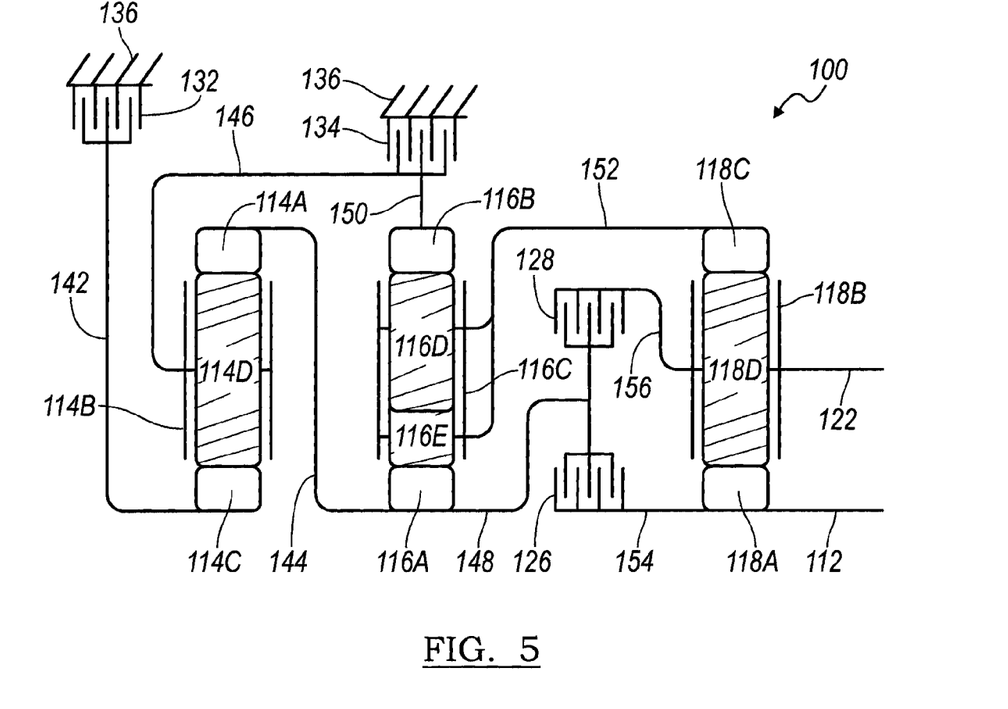
FIG. 5 is a diagrammatic illustration of an embodiment of a five speed transmission according to the present invention.

Referring now to FIG. 5, a stick diagram presents a schematic layout of the embodiment of the five speed transmission 100 according to the present invention. In FIG. 5, the numbering from the lever diagram of FIG. 4 is carried over. The clutches and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114C, a ring gear member 114A and a planet gear carrier member 114B that rotatably supports a set of planet gears 114D (only one of which is shown). The sun gear member 114C is connected for common rotation with a first shaft or interconnecting member 142. The ring gear member 114A is connected for common rotation with a second shaft or interconnecting member 144. The planet carrier member 114B is connected for common rotation with a third shaft or interconnecting member 146. The planet gears 114D are each configured to intermesh with both the sun gear member 114C and the ring gear member 114A.

The planetary gear set 116 includes a sun gear member 116A, a ring gear member 116B and a planet gear carrier member 116C that rotatably supports a set of planet gears 116D (only one of which is shown) and a set of planet gears 116E (only one of which is shown). The sun gear member 116A is connected for common rotation with a fourth shaft or interconnecting member 148 and the second shaft or interconnecting member 144. The ring gear member 116B is connected for common rotation with a fifth shaft or interconnecting member 150. The planet carrier member 116C is connected for common rotation with a sixth shaft or interconnecting member 152. The planet gears 116D are each configured to intermesh with both the ring gear member 116B and the planet gears 116E. The planet gears 116E are each configured to intermesh with both the planet gears 116D and the sun gear member 116A.

The planetary gear set 118 includes a sun gear member 118A, a ring gear member 118C and a planet gear carrier member 118B that rotatably supports a set of planet gears 118D (only one of which is shown). The sun gear member 118A is connected for common rotation with a seventh shaft or interconnecting member 154 and with the input member 112. The ring gear member 118C is connected for common rotation with the sixth shaft or interconnecting member 152. The planet carrier member 118B is connected for common rotation with an eighth shaft or interconnecting member 156 and with the output member 122. The planet gears 118D are each configured to intermesh with both the sun gear member 118A and the ring gear member 118C.

The input shaft or member 112 is continuously connected to an engine (not shown) or to a turbine of a torque converter (not shown). The output shaft or member 122 is continuously connected with the final drive unit or transfer case (not shown).

The torque-transmitting mechanisms or clutches 126 and 128 and brakes 132 and 134 allow for selective interconnection of the shafts or interconnecting members, members of the planetary gear sets and the housing. For example, the first clutch 126 is selectively engageable to connect the seventh shaft or interconnecting member 154 and the input member 112 with the fourth shaft or interconnecting member 148 and the second shaft or interconnecting member 144. The second clutch 128 is selectively engageable to connect the eighth shaft or interconnecting member 156 and the output member 122 with the fourth shaft or interconnecting member 148 and the second shaft or interconnecting member 144. The first brake 132 is selectively engageable to connect the first shaft or interconnecting member 142 with the stationary element or the transmission housing 136 in order to restrict the member 142 from rotating relative to the transmission housing 136. The second brake 134 is selectively engageable to connect the third shaft or interconnecting member 146 and the fifth shaft or interconnecting member 150 with the stationary element or the transmission housing 136 in order to restrict the members 146 and 150 from rotating relative to the transmission housing 136.

Figure 6:
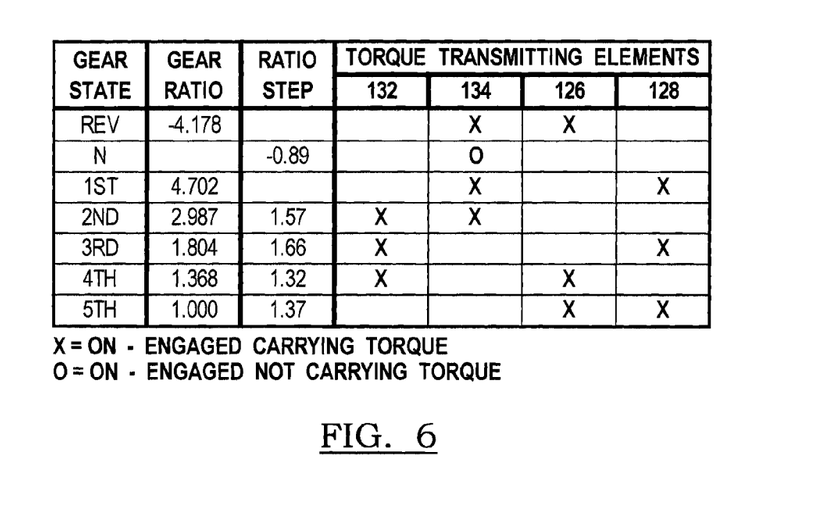
FIG. 6 is a truth table presenting the state of engagement of the various torque transmitting elements in each of the available forward and reverse speeds or gear ratios of the transmission illustrated in FIGS. 4 and 5.

Referring now to FIG. 5 and FIG. 6, the operation of the embodiment of the five speed transmission 100 will be described. It will be appreciated that transmission 100 is capable of transmitting torque from the input shaft or member 112 to the output shaft or member 122 in at least five forward speed or torque ratios and at least one reverse speed or torque ratio. Each forward and reverse speed or torque ratio is attained by engagement of one or more of the torque-transmitting mechanisms (i.e. first clutch 126, second clutch 128, first brake 132 and second brake 134), as will be explained below. FIG. 6 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 6. Of course, other gear ratios are achievable depending on the gear diameter, gear teeth count and gear configuration selected.

To establish a reverse gear, the first clutch 126 and the second brake 134 are engaged or activated. The first clutch 126 connects the seventh shaft or interconnecting member 154 and the input member 112 with the fourth shaft or interconnecting member 148 and the second shaft or interconnecting member 144. The second brake 134 connects the third shaft or interconnecting member 146 and the fifth shaft or interconnecting member 150 with the stationary element or the transmission housing 136 in order to restrict the members 146 and 150 from rotating relative to the transmission housing 136. Likewise, the five forward ratios are achieved through different combinations of clutch and brake engagement, as shown in FIG. 6.

It will be appreciated that the foregoing explanation of operation and gear states of the five speed transmission 100 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 7:
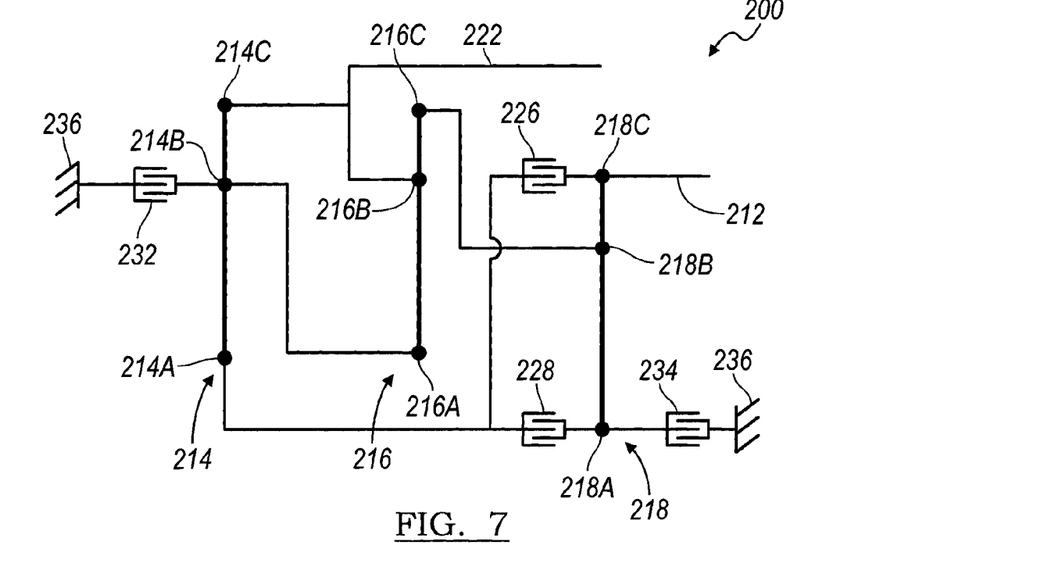
FIG. 7 is a lever diagram of an embodiment of a five speed transmission according to the present invention.

Referring now to FIG. 7, another embodiment of a five speed transmission 200 is illustrated in a lever diagram format. The transmission 200 includes an input shaft or member 212, a first planetary gear set 214, a second planetary gear set 216, a third planetary gear set 218 and an output shaft or member 222. The first planetary gear set 214 has three nodes: a first node 214A, a second node 214B, and a third node 214C. The second planetary gear set 216 has three nodes: a first node 216A, a second node 216B, and a third node 216C. The third planetary gear set 218 has three nodes: a first node 218A, a second node 218B and a third node 218C.

The input member 212 is continuously coupled to the third node 218C of the third planetary gear set 218. The output member 222 is coupled to the third node 214C of the first planetary gear set 214 and to the second node 216B of the second planetary gear set 216. The second node 214B of the first planetary gear set 214 is coupled to the first node 216A of the second planetary gear set 216. The third node 216C of the second planetary gear set 216 is coupled to the second node 218B of the third planetary gear set 218.

A first clutch 226 selectively connects the first node 214A of the first planetary gear set 214 with the third node 218C of the third planetary gear set 218 and the input member 212. A second clutch 228 selectively connects the first node 214A of the first planetary gear set 214 with the first node 218A of the third planetary gear set 218. A first brake 232 selectively connects the second node 214B of the first planetary gear set 214 and the first node 216A of the second planetary gear set 216 with a stationary member or transmission housing 236. A second brake 234 selectively connects the first node 218A of the third planetary gear set 218 with a stationary member or transmission housing 236.

Figure 8:
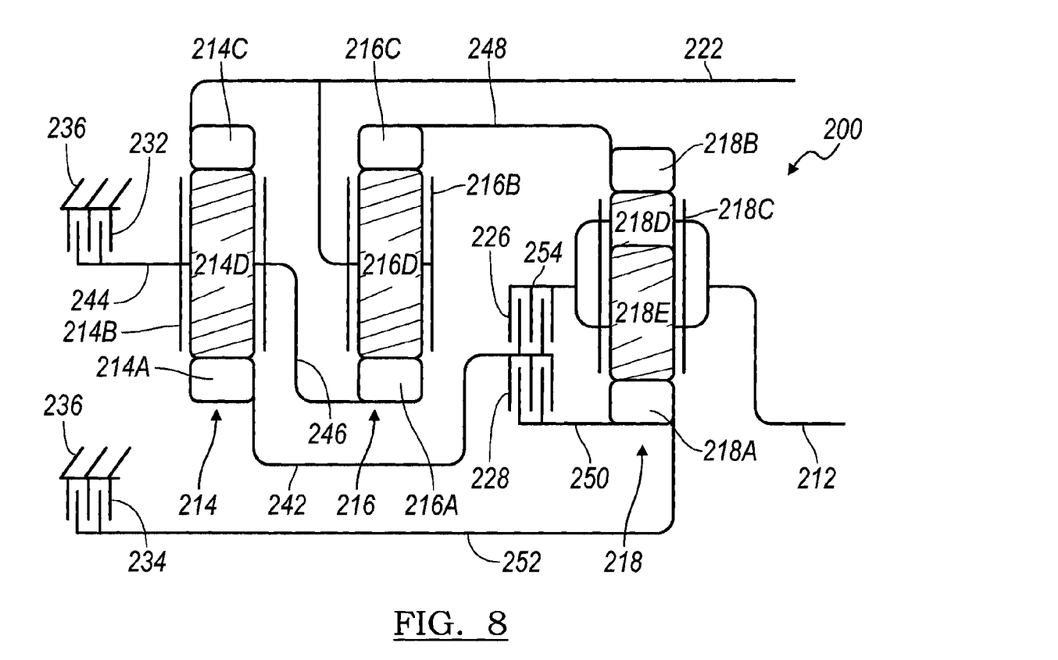
FIG. 8 is a diagrammatic illustration of an embodiment of a five speed transmission according to the present invention.

Referring now to FIG. 8, a stick diagram presents a schematic layout of the embodiment of the five speed transmission 200 according to the present invention. In FIG. 8, the numbering from the lever diagram of FIG. 7 is carried over. The clutches and couplings are correspondingly presented whereas the nodes of the planetary gear sets now appear as components of planetary gear sets such as sun gears, ring gears, planet gears and planet gear carriers.

For example, the planetary gear set 214 includes a sun gear member 214A, a ring gear member 214C and a planet gear carrier member 214B that rotatably supports a set of planet gears 214D (only one of which is shown). The sun gear member 214A is connected for common rotation with a first shaft or interconnecting member 242. The ring gear member 214C is connected for common rotation with the output member 222. The planet carrier member 214B is connected for common rotation with a second shaft or interconnecting member 244 and a third shaft or interconnecting member 246. The planet gears 214D are each configured to intermesh with both the sun gear member 214A and the ring gear member 214C.

The planetary gear set 216 includes a sun gear member 216A, a ring gear member 216C and a planet gear carrier member 216B that rotatably supports a set of planet gears 216D (only one of which is shown). The sun gear member 216A is connected for common rotation with the third shaft or interconnecting member 246. The ring gear member 216C is connected for common rotation with a fourth shaft or interconnecting member 248. The planet carrier member 216B is connected for common rotation with the output member 222. The planet gears 216D are each configured to intermesh with both the sun gear member 216A and the ring gear member 216C.

The planetary gear set 218 includes a sun gear member 218A, a ring gear member 218B and a planet gear carrier member 218C that rotatably supports a set of planet gears 218D (only one of which is shown) and a set of planet gears 218E (only one of which is shown). The sun gear member 218A is connected for common rotation with a fifth shaft or interconnecting member 250 and a sixth shaft or interconnecting member 252. The ring gear member 218B is connected for common rotation with the fourth shaft or interconnecting member 248. The planet carrier member 218C is connected for common rotation with a seventh shaft or interconnecting member 254 and with the input member 212. The planet gears 218D are each configured to intermesh with the ring gear member 218B and the planet gears 218E. The planet gears 218E are each configured to intermesh with both the planet gears 218D and both the sun gear member 218A.

The input shaft or member 212 is continuously connected to an engine (not shown) or to a turbine of a torque converter (not shown). The output shaft or member 222 is continuously connected with the final drive unit or transfer case (not shown).

The torque-transmitting mechanisms or clutches 226 and 228 and brakes 232 and 234 allow for selective interconnection of the shafts or interconnecting members, members of the planetary gear sets and the housing. For example, the first clutch 226 is selectively engageable to connect the first shaft or interconnecting member 242 with the seventh shaft or interconnecting member 254 and the input member 212. The second clutch 228 is selectively engageable to connect the first shaft or interconnecting member 242 with the fifth shaft or interconnecting member 250. The first brake 232 is selectively engageable to connect the second shaft or interconnecting member 244 and the third shaft or interconnecting member 246 with the stationary element or the transmission housing 236 in order to restrict the members 244 and 246 from rotating relative to the transmission housing 236. The second brake 234 is selectively engageable to connect the sixth shaft or interconnecting member 252 with the stationary element or the transmission housing 236 in order to restrict the member 252 from rotating relative to the transmission housing 236.

Figure 9:
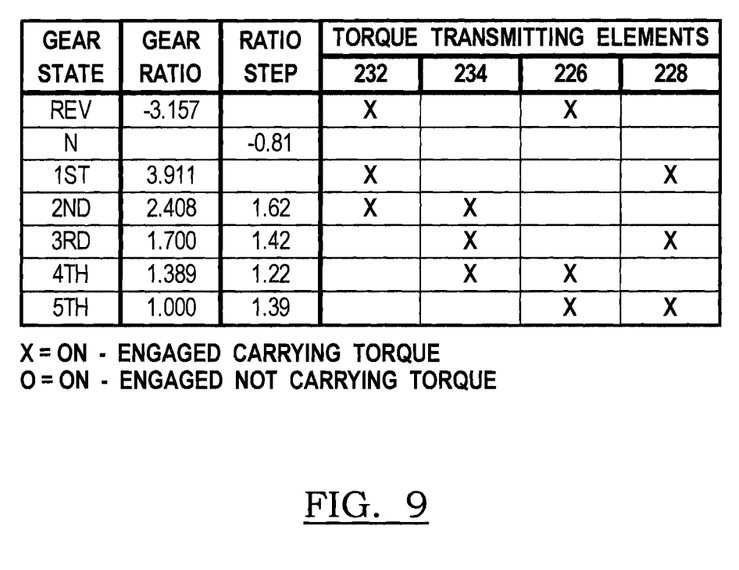
FIG. 9 is a truth table presenting the state of engagement of the various torque transmitting elements in each of the available forward and reverse speeds or gear ratios of the transmission illustrated in FIGS. 7 and 8.

Referring now to FIG. 8 and FIG. 9, the operation of the embodiment of the five speed transmission 200 will be described. It will be appreciated that transmission 200 is capable of transmitting torque from the input shaft or member 212 to the output shaft or member 222 in at least five forward speed or torque ratios and at least one reverse speed or torque ratio. Each forward and reverse speed or torque ratio is attained by engagement of one or more of the torque-transmitting mechanisms (i.e. first clutch 226, second clutch 228, first brake 232 and second brake 234), as will be explained below. FIG. 9 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 200. An example of the gear ratios that may be obtained using the embodiments of the present invention are also shown in FIG. 9. Of course, other gear ratios are achievable depending on the gear diameter, gear teeth count and gear configuration selected.

To establish a reverse gear, the first clutch 226 and the first brake 232 are engaged or activated. The first clutch 226 connects the first shaft or interconnecting member 242 with the seventh shaft or interconnecting member 254 and the input member 212. The first brake 232 connects the second shaft or interconnecting member 244 and the third shaft or interconnecting member 246 with the stationary element or the transmission housing 236 in order to restrict the members 244 and 246 from rotating relative to the transmission housing 236. Likewise, the five forward ratios are achieved through different combinations of clutch and brake engagement, as shown in FIG. 9.

It will be appreciated that the foregoing explanation of operation and gear states of the five speed transmission 200 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission comprising:
    an input member;
    an output member;
    first, second and third planetary gear sets each having first, second and third members, wherein the input and output members are each interconnected to at least one of the first, second, and third planetary gear sets;
    a first interconnecting member continuously interconnecting the second member of the first planetary gear set with the first member of the second planetary gear set;
    a second interconnecting member continuously interconnecting the third member of the first planetary gear set with the third member of the second planetary gear set;
    a third interconnecting member continuously interconnecting the second member of the second planetary gear set with the second member of the third planetary gear set; and
    four torque transmitting mechanisms each selectively engageable to interconnect at least one of the first, second and third members of the first, second and third planetary gear sets with at least one other of the first, second, third members and a stationary member, wherein a first of the four torque transmitting mechanisms is selectively engageable to interconnect the third member of the third planetary gear set with the first member of the second planetary gear set and the second member of the first planetary gear set and a second of the four torque transmitting mechanisms is selectively engageable to interconnect the first member of the third planetary gear set and the input member with the first member of the second planetary gear set and the second member of the first planetary gear set, and wherein the torque transmitting mechanisms are selectively engageable in combinations of at least two to establish at least five forward speed ratios and at least one reverse speed ratio between the input member and the output member.

2. The transmission of claim 1 wherein a third of the four torque transmitting mechanisms is selectively engageable to interconnect the third member of the third planetary gear set with the stationary member.

3. The transmission of claim 2 wherein a fourth of the four torque transmitting mechanisms is selectively engageable to interconnect the first member of the first planetary gear set with the stationary member.

4. The transmission of claim 1 wherein the first member of the first planetary gear set, the third member of the second planetary gear set and the first member of the third planetary gear set are sun gears, the second member of the first planetary gear set, the first member of the second planetary gear set, and the second member of the third planetary gear set are carrier members and the third member of the first planetary gear set, the second member of the second planetary gear set and the third member of the third planetary gear set are ring gears.

5. The transmission of claim 1 wherein two of the torque transmitting mechanisms are brakes for connecting a plurality of the first, second, and third members to the stationary member and two of the torque transmitting mechanisms are clutches for connecting at least one of the first, second, and third members of the first, second and third planetary gear sets to at least one other first, second and third members.

6. The transmission of claim 1 wherein the input member is continuously interconnected to the first member of the third planetary gear set.

7. The transmission of claim 1 wherein the output member is continuously interconnected to the third member of the first planetary gear set and to the third member of the second planetary gear set.

\* \* \* \* \*